US010289743B2

(12) United States Patent
Gittelman et al.

(10) Patent No.: US 10,289,743 B2
(45) Date of Patent: May 14, 2019

(54) CLIENT-SIDE MINIMAL DOWNLOAD AND SIMULATED PAGE NAVIGATION FEATURES

(75) Inventors: Arye Gittelman, Mercer Island, WA (US); Petru Mihai Moldovanu, Redmond, WA (US); Sterling John Crockett, Bothell, WA (US); Jonathan Fred Keslin, Kirkland, WA (US); Aditi Mandal, Bothell, WA (US); Cindy Liao Hartwig, Sammamish, WA (US); Erin Megan Riley, Issaquah, WA (US); Xiaomei Wang, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1116 days.

(21) Appl. No.: 13/354,164

(22) Filed: Jan. 19, 2012

(65) Prior Publication Data

US 2013/0191435 A1 Jul. 25, 2013

(51) Int. Cl.
*G06F 15/16* (2006.01)
*G06F 17/30* (2006.01)
*H04L 29/08* (2006.01)

(52) U.S. Cl.
CPC .. *G06F 17/30873* (2013.01); *G06F 17/30899* (2013.01); *H04L 67/02* (2013.01); *H04L 67/10* (2013.01)

(58) Field of Classification Search
CPC .... H04L 67/02; H04L 67/10; G06F 17/30864
USPC ........................................ 709/201, 246, 207
See application file for complete search history.

(56) References Cited

U.S. PATENT DOCUMENTS

| 5,781,714 A * | 7/1998 | Collins ................. G06F 17/214 345/471 |
|---|---|---|
| 6,396,500 B1 | 5/2002 | Qureshi et al. |
| 6,691,176 B1 | 2/2004 | Narin |
| 6,865,599 B2 | 3/2005 | Zhang |
| 7,058,700 B1 | 6/2006 | Casalaina |

(Continued)

FOREIGN PATENT DOCUMENTS

| CN | 1682183 A | 10/2005 |
|---|---|---|
| CN | 1979485 A | 6/2007 |

(Continued)

OTHER PUBLICATIONS

Jason Lengstorf, "Pro PHP and jQuery", Jun. 22, 2010, Apress, p. 1-392.*

(Continued)

*Primary Examiner* — Taylor A Elfervig
(74) *Attorney, Agent, or Firm* — Merchant & Gould P.C.

(57) ABSTRACT

A client computing architecture is provided that utilized minimal download and simulated page navigation features. A client computer may receive a payload comprising delta data in response to a navigation request for an electronic page. The client computer may further parse the delta data for the electronic page, update page contents for the electronic page based on the received delta data, determine whether one or more errors are associated with a page load process for the electronic page, manage a fragment identifier portion of a uniform resource locator (URL) to track a current location in a navigation of the electronic page, and intercept one or more navigation click events to ensure a minimal download strategy navigation.

17 Claims, 7 Drawing Sheets

(56) References Cited

U.S. PATENT DOCUMENTS

| | | | |
|---|---|---|---|
| 7,185,063 B1* | 2/2007 | Kasriel | H04L 67/2814 709/216 |
| 7,188,214 B1 | 3/2007 | Kasriel et al. | |
| 7,275,244 B1 | 9/2007 | Bell et al. | |
| 7,296,051 B1 | 11/2007 | Kasriel | |
| 7,392,325 B2 | 6/2008 | Grove et al. | |
| 7,434,163 B2 | 10/2008 | McKellar | |
| 7,487,261 B1* | 2/2009 | Kasriel | G06F 17/30902 709/213 |
| 7,703,015 B2 | 4/2010 | McKellar et al. | |
| 7,765,274 B2 | 7/2010 | Kasriel et al. | |
| 7,831,556 B2 | 11/2010 | Behl et al. | |
| 7,904,432 B2 | 3/2011 | McKay et al. | |
| 8,271,333 B1* | 9/2012 | Grigsby | G06F 17/30017 705/14.4 |
| 8,700,691 B2 | 4/2014 | Gittelman et al. | |
| 2002/0140729 A1 | 10/2002 | Prince | |
| 2003/0135399 A1 | 7/2003 | Ahamparam | |
| 2003/0220944 A1 | 11/2003 | Schottland et al. | |
| 2004/0139169 A1* | 7/2004 | O' Brien | G06F 17/30873 709/217 |
| 2006/0020631 A1* | 1/2006 | Cheong Wan | G11B 27/105 |
| 2006/0031379 A1 | 2/2006 | Kasriel et al. | |
| 2006/0036938 A1 | 2/2006 | Quaranta | |
| 2006/0212454 A1 | 9/2006 | Behl et al. | |
| 2007/0067418 A1 | 3/2007 | Isaacs et al. | |
| 2007/0136415 A1 | 6/2007 | Behl et al. | |
| 2007/0300206 A1 | 12/2007 | Petrov | |
| 2008/0077653 A1 | 3/2008 | Morris | |
| 2008/0104256 A1 | 5/2008 | Olston | |
| 2008/0134014 A1 | 6/2008 | Hind et al. | |
| 2008/0147875 A1 | 6/2008 | Stapels | |
| 2008/0228773 A1 | 9/2008 | Stewart et al. | |
| 2009/0007241 A1 | 1/2009 | Tewari et al. | |
| 2009/0015599 A1* | 1/2009 | Bennett | G06F 3/0486 345/680 |
| 2009/0019133 A1 | 1/2009 | Brimley | |
| 2009/0080523 A1 | 3/2009 | McDowell | |
| 2009/0100228 A1 | 4/2009 | Lepeska et al. | |
| 2009/0219829 A1 | 9/2009 | Merkey et al. | |
| 2009/0259552 A1 | 10/2009 | Chenard et al. | |
| 2009/0259934 A1* | 10/2009 | Prisament | G06F 17/30893 715/234 |
| 2009/0271778 A1 | 10/2009 | Mandyam | |
| 2009/0300709 A1 | 12/2009 | Chen | |
| 2009/0327510 A1 | 12/2009 | Edelman et al. | |
| 2010/0257413 A1* | 10/2010 | Brunet | G06F 17/30899 714/57 |
| 2011/0029641 A1 | 2/2011 | Fainberg et al. | |
| 2012/0016655 A1* | 1/2012 | Travieso | G06F 17/2827 704/2 |
| 2012/0317493 A1 | 2/2012 | Vike | |
| 2012/0191840 A1* | 7/2012 | Gordon | G06F 17/30887 709/223 |
| 2012/0239731 A1* | 9/2012 | Shyamsunder | G06F 17/30876 709/203 |
| 2013/0191492 A1 | 7/2013 | Gittelman et al. | |
| 2014/0164470 A1 | 6/2014 | Gittelman et al. | |

FOREIGN PATENT DOCUMENTS

| | | |
|---|---|---|
| CN | 101689194 A | 3/2010 |
| EP | 1388783 A1 | 2/2004 |
| JP | 2002-189618 | 7/2002 |
| JP | 2002520735 A | 7/2002 |
| JP | 2004-38439 | 2/2004 |
| WO | 2011035944 A1 | 3/2011 |

OTHER PUBLICATIONS

N. Skrupsky, M. Monshizadeh, P. Bisht, T. Hinrichs, V. N. Venkatakrishnan and L. Zuck, "WAVES: Automatic Synthesis of Client-Side Validation Code for Web Applications," 2012 International Conference on Cyber Security, Washington, DC, 2012, pp. 46-53. (Year: 2012).*

A. Mesbah and A. van Deursen, "Migrating Multi-page Web Applications to Single-page AJAX Interfaces," 11th European Conference on Software Maintenance and Reengineering (CSMR'07), Amsterdam, 2007, pp. 181-190. (Year: 2007).*

J. Mickens. Silo: Exploiting JavaScript and DOM Storage for Faster Page Loads. In Proc. of USENIX conference on Web Application Development (WebApps), 2010. (Year:2010).*

Zaidman, A., Matthijssen, N., Storey, MA. et al. Empir Software Eng (2013) 18: 181. https://doi.org/10.1007/s10664-012-9200-5 (Year: 2013).*

A. Mesbah, E. Bozdag and A. v. Deursen, "Crawling AJAX by Inferring User Interface State Changes," 2008 Eighth International Conference on Web Engineering, Yorktown Heights, NJ, 2008, pp. 122-134. (Year: 2008).*

Muthitacharoen, et al., "A Low-bandwidth Network File System", In Proceedings of the Eighteenth ACM Symposium on Operating Systems Principles, Dec. 2001, pp. 174-187.

Henson, Val, "An Analysis of Compare-by-hash" In Proceedings of the 9th Conference on Hot Topics in Operating Systems, vol. 9, 2003, 6 pages.

Chinese Office Action dated Dec. 1, 2014 in Application No. 201210514067.8, 18 pgs.

"Updating Multiple Page Elements with Grails and Ajax", Published on: Jul. 20, 2009, Available at: http://weichhold.com/2009/07/20/updating-multiple-page-fragments-with-grails-and-ajax/, 5 pages.

International Search Report and Written Opinion for PCT/US2012/066490 dated Feb. 19, 2013.

Kubica, Marek, "Howto Use Python in the Web", Retrieved on: Nov. 17, 2011, Available at: http://docs.python.org/howto/webservers.html#howto-use-python-in-the-web, 12 pages.

Mitchell, Scott, "Serving Dynamic Content with HTTP Handlers", Published on: Apr. 2004, Available at: http://msdn.microsoft.com/en-us/library/ms972953.aspx, 22 pages.

Naaman, et al., "Evaluation of ESI and Class-Based Delta Encoding", In Proceedings of the 8th International Workshop on Web Caching and Content Distribution, 2003, 12 pages.

Savant, et al., "Server-Friendly Delta Compression for Efficient Web Access", In Proceedings of the Eighth International Workshop on {Web} Content Caching and Distribution, Sep. 2003, 12 pages.

U.S. Non-Final Office Action for U.S. Appl. No. 13/310,991 dated Mar. 15, 2013.

U.S. Appl. No. 13/310,991, filed Dec. 5, 2011 entitled Minimal Download and Simulated Page Navigation Features.

U.S. Appl. No. 13/353,963, filed Jan. 19, 2012 entitled Server-Side Minimal Download and Error Failover.

Wahli, et al., "WebSphere Studio 5.1.2 JavaServer Faces and Service Data Objects", Published on: Jul. 2004, Available at: http://www.redbooks.ibm.com/redbooks/pdfs/sg246361.pdf.

International Search Report and Written Opinion dated Apr. 30, 2013 in Application No. PCT/US2013/021613, 9 pages.

International Search Report and Written Opinion dated Apr. 25, 2013 in Application No. PCT/US2013/021612, 10 pages.

Mesbah et al., "SPIAR: An architectural style for single page internet applications," Stichting Centrum voor Wiskunde en Informatica, Apr. 2006, ISSN 1386-369X, http://oai.cwi.nl/oai/asset/10866/10866D.pdf, 12 pages.

Chinese Second Office Action dated Jul. 31, 2015 in Application No. 201210514067.8, 6 pgs.

Mesbah et al., "Exposing the Hidden-Web Induced by Ajax"; Delft University of Technology, Software Engineering Research Group, Technocal Report Series, Jan. 7, 2008; © Copyright 2008; 14 pgs.

EP Communication dated Dec. 7, 2015 in Application No. PCT/US2013/021612, 10 pgs.

U.S. Office Action for U.S. Appl. No. 14/182,153 dated Sep. 11, 2015, 45 pgs.

U.S. Office Action for U.S. Appl. No. 13/353,963 dated Sep. 1, 2015, 43 pgs.

U.S. Appl. No. 13/353,963 Office Action dated Mar. 24, 2017, 32 pgs.

(56) References Cited

OTHER PUBLICATIONS

Chinese 2nd Office Action mailed in Application 201380006055.7, dated Mar. 14, 2017, 13 Pages.
Japanese Office Action mailed in Application 2014-553349, dated Feb. 14, 2017, 8 Pages.
Shono, Atsushi et al., "Efficient Dynamic Web Contents Delivery Method Utilizing Fingerprint Cache", in the Journal, Information Processing Society of Japan (IPSJ), vol. 46, No. 2, Feb. 15, 2005, pp. 570-584. (with English abstract).
U.S. Appl. No. 14/182,153, Office Action dated Oct. 6, 2016, 25 pgs.
Chinese Notice of Allowance in Application No. 201380006024.1, dated Sep. 7, 2016, 7 pgs.
Chinese Notice on Grant dated Jan. 13, 2016 in Appln. No. 201210514067.8, 4 pgs.
Chinese Office Action and Search Report Issued in Chinese Patent Application No. 201380006024.1, dated Dec. 28, 2015, 11 Pages.
European Official Communication in Application 13738059.8, dated Jan. 4, 2016, 1 page.
European Official Communication in Application 13738202.4, dated Jul. 7, 2015, 1 page.
U.S. Office Action for U.S. Appl. No. 13/353,963 dated Feb. 11, 2016, 37 pgs.
U.S. Office Action for U.S. Appl. No. 14/182,153 dated Mar. 15, 2016, 36 pgs.
U.S. Appl. No. 13/310,991 Notice of Allowance dated Nov. 15, 2013, 17 pgs.
U.S. Appl. No. 13/310,991 Notice of Allowance dated Jan. 13, 2014, 15 pgs.
U.S. Appl. No. 14/182,153, Office Action dated May 5, 2017, 27 pgs.
Chinese 1st Office Action in Application 201380006055.7, dated Jul. 15, 2016, 12 pgs.
Lengstorf, Jason, "Pro PHP and jQuery", published 2010, Apress, pp. 22, 73 and 79, 8 pages total.
Supplementary Search Report Received for European Patent Application No. 13738202.4, dated Jun. 18, 2015, 6 Pages.
U.S. Appl. No. 13/353,963, Amendment and Response filed Jun. 21, 2017, 16 pages.

"Xiangpai Qin and X. Zhou, ""DB Facade: A Web Cache with Improved Data Freshness,"" 2009 Second International Symposium onElectronic Commerce and Security, Nanchang, 2009, pp. 483-487."
"S. Sulaiman, S. M. Shamsuddin and A. Abraham, ""Intelligent Web caching using Adaptive Regression Trees, Splines, RandomForests and Tree Net,"" 2011 3rd Conference on Data Mining and Optimization (OMO), Putrajaya, 2011, pp. 108-114."
"P. Ghosh and A. Rau-Chaplin, ""Performance of Dynamic Web Page Generation for Database-driven Web Sites,"" InternationalConference on Next Generation Web Services Practices, Seoul, 2006, pp. 56-63."
"K. Psounis, ""Class-based delta-encoding: a scalable scheme for caching dynamic Web content,"" Proceedings 22nd InternationalConference on Distributed Computing Systems Workshops, 2002, pp. 799-805."
U.S. Appl. No. 13/353,963, Notice of Allowance dated Aug. 11, 2017, 17 pages.
U.S. Appl. No. 14/182,153, Office Action dated Dec. 12, 2017, 22 pgs.
"Office Action Issued in Japanese Patent Application No. 2014-553349", dated Oct. 30, 2017, 9 Pages.
Chinese 3rd Office Action in Application 201380006055.7, dated Sep. 19, 2017, 18 pages.
U.S. Appl. No. 14/182,153, Advisory Action dated Sep. 18, 2017, 5 pgs.
U.S. Appl. No. 14/182,153, Notice of Allowance dated May 25, 2018, 9 pgs.
"Fourth Office Action and Search Report Issued in Chinese Patent Application No. 201380006055.7", dated Apr. 4, 2018, 8 Pages.
"Office Action Issued in European Patent Application No. 13738059.8", dated Jul. 18, 2018, 6 Pages.
"First Office Action and Search Report Issued in Chinese Patent Application No. 201610182032.7", dated Sep. 10, 2018, 21 Pages.
"Office Action Issued in Korean Patent Application No. 10-2014-7020024", dated Mar. 13, 2019, 7 Pages.
"Second Office Action Issued in Chinese Patent Application No. 201610182032.7", dated Feb. 14, 2019, 10 Pages.

* cited by examiner

CLIENT-SIDE MINIMAL DOWNLOAD AND SIMULATED PAGE NAVIGATION FEATURES

CROSS-REFERENCE TO RELATED APPLICATIONS

This application is related to U.S. patent application Ser. No. 13/310,991, filed on Dec. 5, 2011, entitled "Minimal Download and Simulated Page Navigation Features", and issued as U.S. Pat. No. 8,700,691. This application is also related to U.S. patent application Ser. No. 13/353,963, filed on Jan. 19, 2012, entitled "Server-Side Minimal Download and Error Failover", and issued as U.S. Pat. No. 9,846,605. The disclosure of both of the aforementioned applications is hereby incorporated herein, in their entirety, by reference.

BACKGROUND

The computing age has dramatically affected the consumer knowledge base which, in turn, requires device and application providers to provide user-friendly and rich application functionality. Collaboration or content management systems provide a natural place to share ideas and information due in part to access and management abilities offered to multiple users, rich customization options, and a lightweight collaborative environment. However, a general problem pertains to reducing the amount of data sent from a server computer to a client computer during a web page navigation operation. One solution utilizes traditional web page navigation and employs data compression. A drawback associated with this solution is that data compression doesn't help enough. That is, the time it takes for the client computer to perform the traditional web page navigation is very large in spite of the fact that the data sent from the server computer to the client computer over a network is compressed (and hence smaller). Another solution utilizes non-navigation operations (i.e., "AJAX") and requires a client computer to request specific data changes. Drawbacks associated with this solution include: a) a complete rewrite of the web page is required, b) each individual part of a page may update separately, which can be very expensive and inefficient, and c) page changes are not recorded in a browser history such that the back and forward buttons or other navigation features do not operate as expected.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

A client computing architecture is provided that utilized minimal download and simulated page navigation features. A client computer may receive a payload comprising delta data in response to a navigation request for an electronic page. The client computer may further parse the delta data for the electronic page, update page contents for the electronic page based on the received delta data, determine whether one or more errors are associated with a page load process for the electronic page, manage a fragment identifier portion of a uniform resource locator (URL) to track a current location in a navigation of the electronic page, and intercept one or more navigation click events to ensure a minimal download strategy navigation.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

A client computing architecture is provided that utilized minimal download and simulated page navigation features. A client computer may receive a payload comprising delta data in response to a navigation request for an electronic page. It should be understood, that in accordance with the embodiments described herein, "delta data" is defined as incremental page rendering information for an electronic page. The client computer may further parse the delta data for the electronic page, update page contents for the electronic page based on the received delta data, determine whether one or more errors are associated with a page load process for the electronic page, manage a fragment identifier portion of a uniform resource locator (URL) to track a current location in a navigation of the electronic page, and intercept one or more navigation click events to ensure a minimal download strategy navigation.

Figure 1:
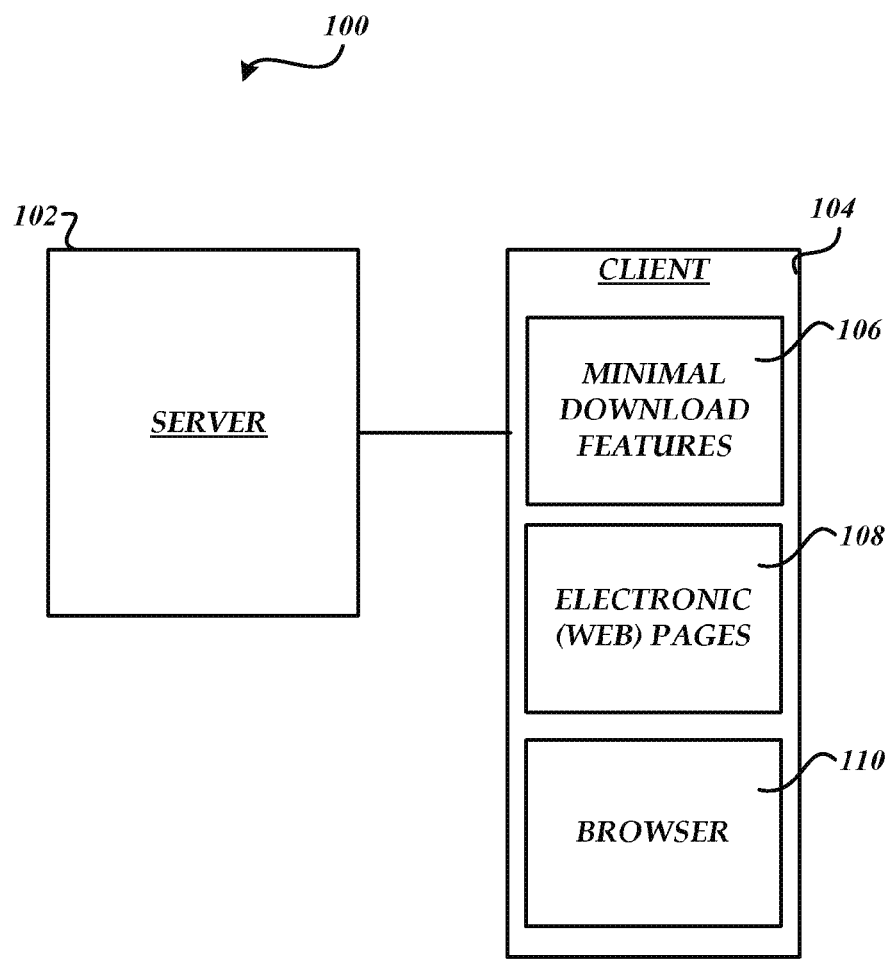
FIG. 1 is a block diagram of an exemplary computing environment, in accordance with an embodiment.

FIG. 1 is a block diagram of an exemplary computing environment 100, in accordance with an embodiment. The computing environment 100 may include processing, memory, networking, and/or other components that provide electronic page navigation features and functionality, including server minimal download and error failover for requested electronic pages. As shown in FIG. 1, the exemplary computing environment 100 includes at least one server system or server 102 and at least one client 104 that are used as part of implementing a page navigation mechanism or process, but is not so limited. Those skilled in the art will recognize that a plurality of client devices/systems can be configured to communicate and/or interact with a number of servers and/or other components using available wireless and/or wired infrastructure and functionalities. For example, a user can use the client 104 as part of interacting with a computing device or system to access and use information and resources of a plurality of collaboration, web, file, and/or other servers as part of browsing electronic or web pages. It will be appreciated that during a typical interactive session, a user can use the client 104 to call on and access server information and/or services from a plurality of physical serving machines (e.g., web server, collaboration server, database server, etc.).

The client 104 comprises minimal download features 106, electronic (web) pages 108 and a browser 110. As will be described below, the minimal download features 106 may be utilized as part of a minimal download electronic page navigation to parse and filter a "delta" payload sent by the server 102 for updating an electronic page 108. In accordance with the aforementioned technique, the client knows about the exact state of an electronic page and can filter the set of content in the "delta" down to just those portions that have changed and/or must be updated.

It will be appreciated that other user devices/systems can be included that couple, communicate, and/or interact with one or more components of the environment 100 as part of providing page navigation features and functionality. Each server can include one or multiple physical serving machines, including co-location, remote-location, and/or distributed architectures. End-users can use different interactive applications, including browser-type applications such as those used with smartphones, laptop computers, tablet computers, desktop computers, and/or other computer/communication interfaces, to access features of the environment 100. For example, an enterprise user can use a browser or other application to create and/or access a SHAREPOINT worksite using a browser-type interface. In an embodiment, a user can use a browser application or interface to leverage the features and functionality of the exemplary computing environment 100, including existing and/or future standards, cross-browser compatible markup, etc.

Figure 2:
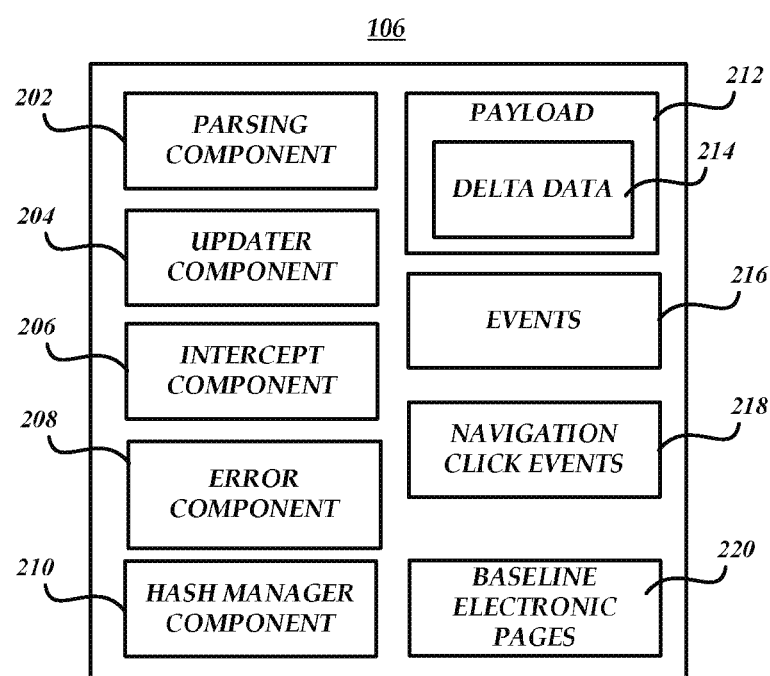
FIG. 2 is a block diagram illustrating exemplary client minimal download features, in accordance with an embodiment.

FIG. 2 is a block diagram illustrating exemplary minimal download features 106, in accordance with an embodiment. The minimal download features 106 may comprise a parsing component 202, an updater component 204, an intercept component 206, an error component 208, a hash manager component, a payload 212 (which includes delta data 214), events 216, navigation click events 218 and baseline electronic pages 220.

In accordance with an embodiment, the client 104 may utilize the parsing component 202 to parse the delta data 214 for an electronic page. The updater component 204 may be utilized to update page contents for the electronic page based on the received delta data 214. The intercept component 206 may be utilized to intercept one or more navigation click events 218 to ensure a minimal download strategy navigation to the electronic page. The error component 208 may be utilized to determine whether one or more errors are associated with a page load process for the electronic page and take actions based on any determined errors. The aforementioned actions may include, without limitation, reloading a baseline electronic page 220 associated with an electronic page for which a navigation request was received and redirecting a navigation request to a baseline electronic page 220 in response to the navigation request. As defined herein, a baseline electronic page (also known as a static baseline page) comprises an electronic page without any page content which represents a snapshot of common user interface elements which are shared by multiple electronic pages in a web site. The hash manager component 210 may be utilized to manage a fragment identifier (i.e., a "hash") portion of a uniform resource locator (URL) to track a current location in a navigation of an electronic page. The events 216 may comprise an unload event which is fired by the updater component 204 so that controls on a previous electronic page (i.e., an electronic page previous to the electronic page currently being navigated to on the client) can handle it as necessary.

Figure 3:
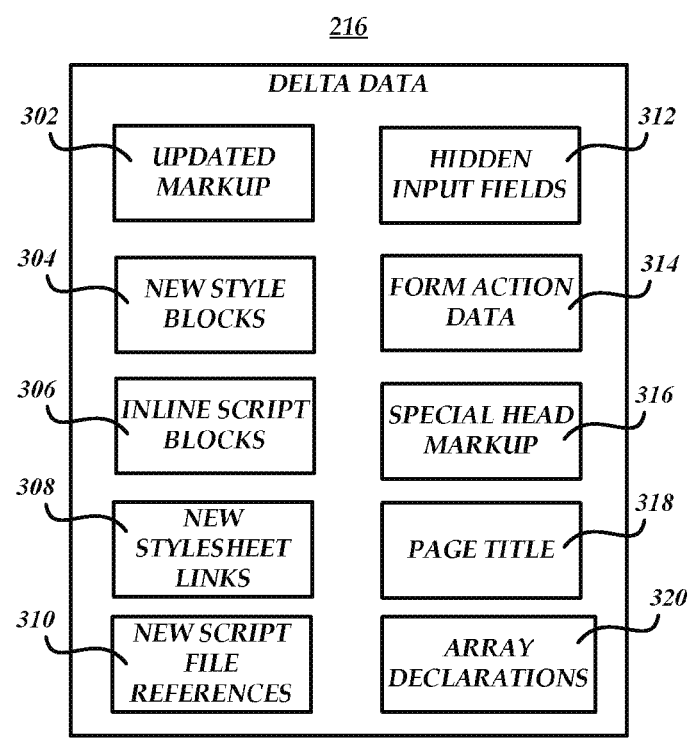
FIG. 3 is a block diagram illustrating exemplary delta data for updating an electronic page during a minimal download process, in accordance with an embodiment.

FIG. 3 is a block diagram illustrating exemplary delta data 216 for updating an electronic page during a minimal download process, in accordance with an embodiment. The delta data 216 may include, but is not limited to, updated markup 302, new style blocks 304, inline script blocks 306, new stylesheet links 308, new script file references 310, hidden input fields 312, form action data 314, special head markup 316, page title (i.e., the electronic page title) 318 and array declarations 320.

Figure 4:
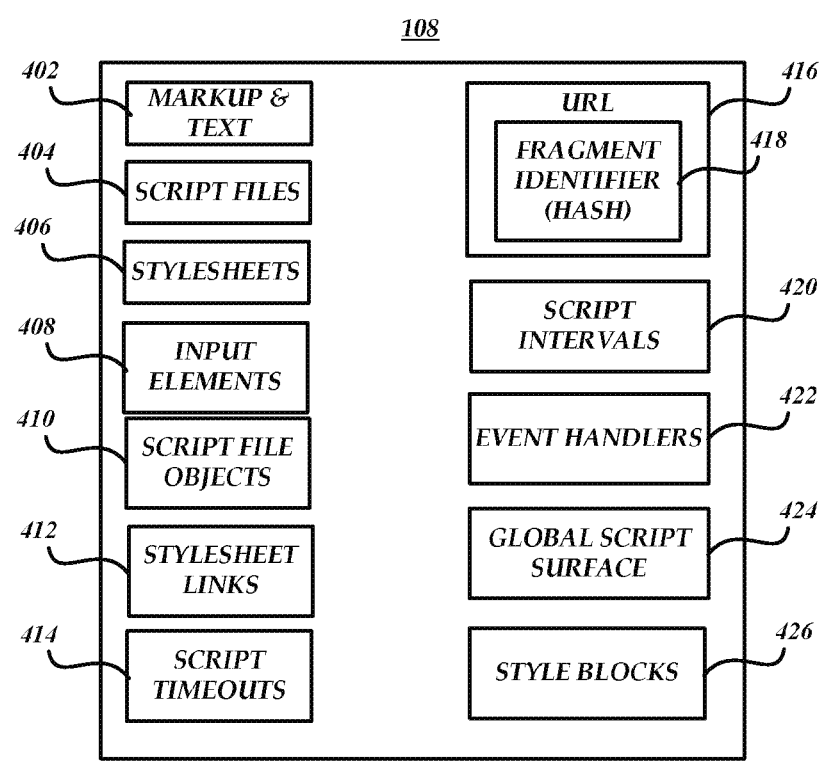
FIG. 4 is a block diagram illustrating an exemplary electronic page, in accordance with an embodiment.

FIG. 4 is a block diagram illustrating an exemplary electronic page 108, in accordance with an embodiment. The electronic page 108 may include, without limitation, markup and text 402, script files 404, stylesheets 406, input elements 408 (i.e., input elements from forms in an electronic page), script file objects 410, stylesheet links 412, script timeouts 414 and uniform resource locator ("URL") 416. The URL 416 may include a fragment identifier (hash) 418 which is a portion of the URL 416. The electronic page 108 may further include (without limitation) script intervals 420, event handlers 422, global script surface 424 and style blocks 426.

Figure 5:
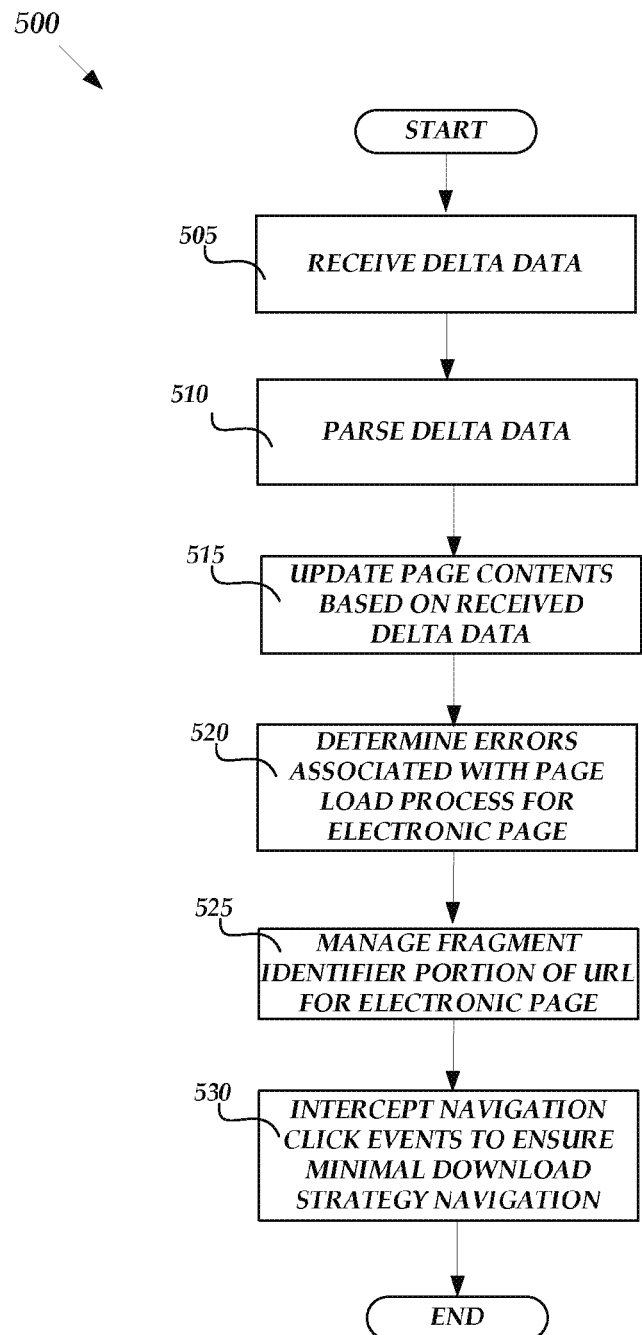
FIG. 5 is a flow diagram illustrating an exemplary client minimal download process, in accordance with an embodiment.

FIG. 5 is a flow diagram illustrating an exemplary client minimal download process 500, in accordance with an embodiment. At 505, the process 500 begins when a client computer (i.e., a client) receives delta data from a server in response to a navigation request for an electronic page. In particular, the client may receive a payload comprising the delta data from the server in response to a navigation request made by entering a URL into a web browser.

At 510, the client parses the delta data for the electronic page. As discussed above, the client may parse and filter delta data sent in a payload by the server. The client may be configured to determine the exact state of the electronic page and to filter a set of content in the delta data down to just those portions that have changed and/or must be updated.

At 515, the client updates page contents for the electronic page based on the received delta data. It should be understood that in updating the aforementioned page contents, the client may be configured to ensure that the electronic page's state (e.g., in markup, styles, scripts, etc.) match what would exist on a full page load. An exemplary process of updating the page contents may contain several steps which will be described in detail with respect to FIG. 6 below.

At 520, the client determines errors associated with a page load process for the electronic page. In particular, the client may determine error cases and "failover" to various options based on the error encountered. It should be understood that, as defined herein, "errors" are "situations" which make it impossible or unreasonable to render the delta data thereby requiring a failover process with respect to the electronic page. It should be understood that error cases may occur prior to or during the page load process. In the former, the server may send an error code response instead of the "delta" payload. In the latter, an error might occur during any of the steps 505-515 discussed above. It should also be understood that, in accordance with an embodiment, receiving simple (i.e., non-delta) markup data from the server may constitute an error case (i.e., the complete markup of a conventional web page).

In accordance with an embodiment, when an error is determined, a failover action will occur. The client may perform one the following actions in response to an error: (1) Restart the minimal download strategy (i.e., a baseline electronic page is reloaded and navigation to the requested page is re-run); (2) Redirect to a different baseline electronic page in response to the navigation request (i.e., a different baseline electronic page than a baseline electronic page previously associated with the requested electronic page); and (3) redirect to a fully rendered electronic page (i.e., the delta data is not utilized) in response to a navigation request. It should be understood that redirecting to a fully rendered page is equivalent to a traditional electronic page navigation. It should be understood that while the server can handle errors and determine which action should be taken to "failover," the client performs the actual work.

At 525, the client manages a fragment identifier portion of the URL for an electronic page. In accordance with an embodiment, the fragment identifier (i.e., "hash") portion of the URL may be used to track a current location in a minimal download strategy navigation. The fragment identifier may be used by many controls and components on an electronic page. It should be appreciated that while previous hash management solutions had limited functionality when more than component that uses a hash is on an electronic page, the client in the present embodiment may provide an API for multiple to register for data slots in the fragment identifier. Therefore, multiple page components are enabled to use the fragment identifier without interference.

At 530, the client intercepts navigation click events to ensure minimal download strategy navigation (i.e., navigation utilizing the delta data). In particular, the client may provide a global "on-click" handler and several local "on-click" handlers to intercept navigation click events associated with navigating to an electronic page. Thus, it should be understood that the client may be configured to ensure that navigations occur via a minimal download strategy whenever possible. From 530, the process 500 then ends.

It will be appreciated that processing, networking, and/or other features can assist in providing the process described above. Aspects of the process 500 can be distributed to and among other components of a computing architecture, and client, server, and other examples and embodiments are not intended to limit features described herein. While a certain number and order of operations is described for the exemplary flow of FIG. 5, it will be appreciated that other numbers and/or orders can be used according to desired implementations.

Figure 6:
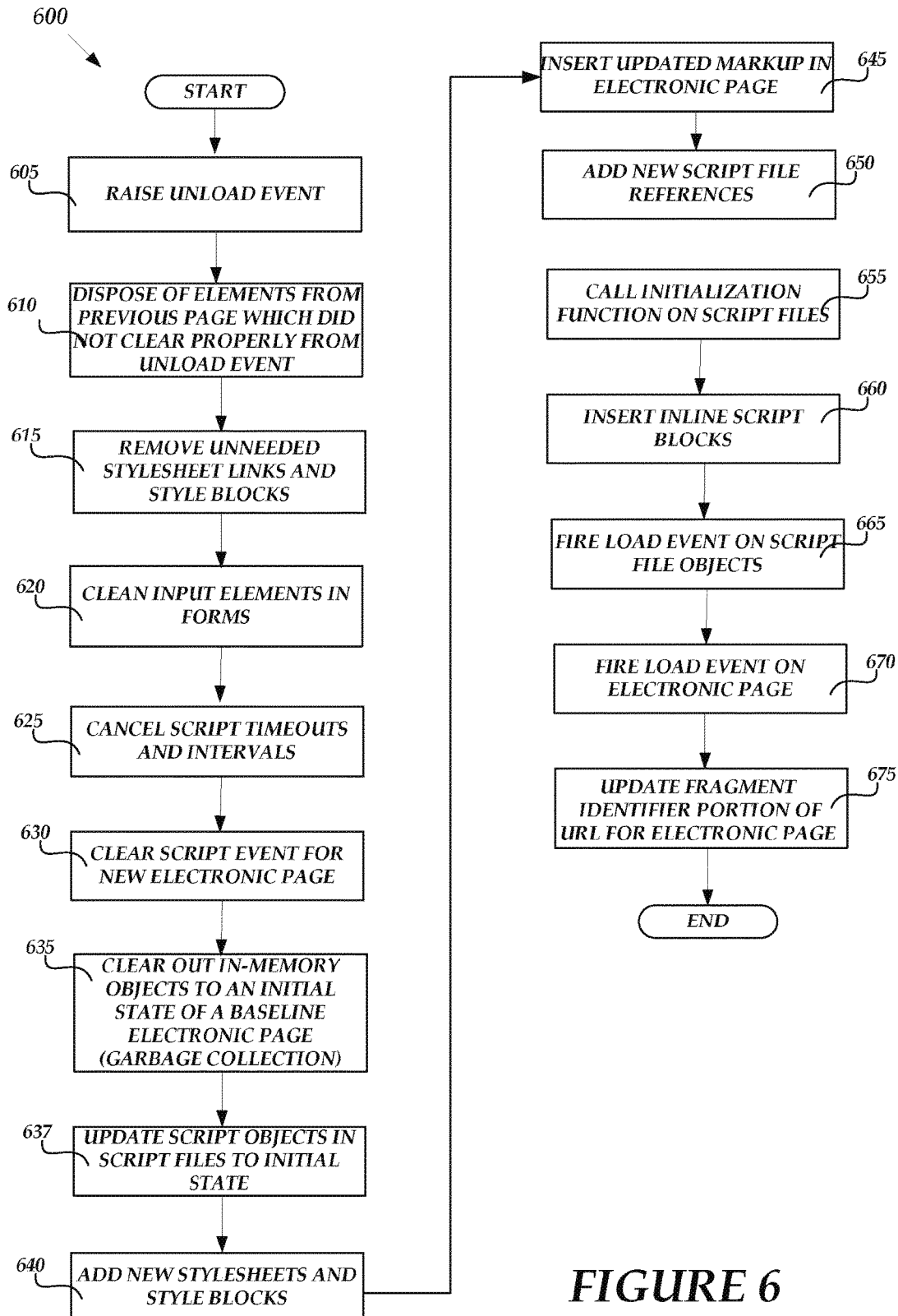
FIG. 6 is a flow diagram illustrating an exemplary process for updating electronic page contents during a client minimal download process, in accordance with an embodiment.

FIG. 6 is a flow diagram illustrating an exemplary process 600 for updating electronic page contents during a client minimal download process, in accordance with an embodiment. At 605, the process 600 begins when the client raises an "unload" event so that controls on a requested electronic page may handle it as necessary.

At 610, the client disposes of elements from a previous electronic page which did not clear properly from the unload event raised at step 605.

At 615, the client removes unneeded stylesheet links and style blocks.

At 620, the client cleans input elements (i.e., removes input elements from any forms on the electronic page). For example, the input elements may be removed from a main electronic form from a previous electronic page.

At 625, the client cancels script timeouts and intervals (i.e., the client clears events for an old or previous electronic page). In accordance with an embodiment, the timeouts and intervals may be canceled using normal script methods. It should be understood that setTimeout and setInterval methods may be utilized to track which timeouts and intervals should be cancelled. In accordance with an embodiment, the timeouts and intervals may comprise JAVASCRIPT timeouts and intervals.

At 630, the client clears a script event for a new electronic page.

At 635, the client clears out clearing in-memory objects to the initial state of a baseline electronic page associated with the requested electronic page. In particular, the client may clear out script objects that no longer apply on the electronic page being navigated to. It should be understood by those skilled in the art that the clearing out of script objects from memory may also be described as "garbage collection." In particular, garbage collection is a standard operation in runtime environments (e.g., .NET and JAVA).

At 637, the client updates script file objects in script files to an initial state. In accordance with an embodiment, the client may utilize a system for loading script files which are intended to be loaded only when needed. The client may update all script file objects to be in their initial state (i.e., a pre-load state).

At 640, the client adds new stylesheets and style blocks.

At 645, the client inserts updated markup into the electronic page. In particular, the client may insert the markup into one or more updateable regions on the electronic page. It should be appreciated that the insertion of the markup at an early stage of updating the page contents for an electronic page enables content to appear more quickly and improves perceived performance during loading. It also ensures that loading content does cause additional scripts to run as the page layout for the electronic page is being updated.

At 650, the client adds new script file references to the electronic page. It should be understood that script files that are not needed but are already loaded do not need to be reloaded in this step.

At 655, the client calls an initialization function on script files for the electronic page. In particular, the client may call an initialization function on each script file (i.e., new and previously-loaded script files) in the order that they are loaded on the electronic page being navigated to. It should be understood that the initialization function may contain all global variable initializations for the electronic page. Thus, the calling of the initialization ensures that the global state of scripts on the electronic page is as it would be on a full page navigation to the electronic page.

At 660, the client inserts inline script blocks on the electronic page.

At 665, the client fires a "load" event on script file objects on the electronic page. In particular, the client may run loaded event handlers. For example, the client may fire the "loaded" event on all of the scripts which are intended to be loaded only when needed, on the electronic page. In accordance with an embodiment, the firing of the "loaded" event may be simulated by the client.

At 670, the client fires a "load" event on the electronic page so that controls on a new electronic page can handle the event as necessary. In accordance with an embodiment, the firing of the "load" event may be simulated by the client. It should be understood that the embodiments discussed herein are not limited to the aforementioned simulations and that additional simulations for other events may also be performed to emulate the life cycle of electronic/web browser pages as web browsers continue to evolve.

At 675, the client updates the fragment identifier portion of the URL for the electronic page to match the URL of the electronic page being navigated to. It should be further understood that at the end of the series of steps 605-675 described above, the scripts, styles and markup of the electronic page are correct and the minimal download strategy navigation may be considered completed. From 675, the process 600 then ends.

It will be appreciated that processing, networking, and/or other features can assist in providing the process described above. Aspects of the process 600 can be distributed to and among other components of a computing architecture, and client, server, and other examples and embodiments are not intended to limit features described herein. While a certain number and order of operations is described for the exemplary flow of FIG. 6, it will be appreciated that other numbers and/or orders can be used according to desired implementations.

While certain embodiments are described herein, other embodiments are available, and the described embodiments should not be used to limit the claims. Exemplary communication environments for the various embodiments can include the use of secure networks, unsecure networks, hybrid networks, and/or some other network or combination of networks. By way of example, and not limitation, the environment can include wired media such as a wired network or direct-wired connection, and/or wireless media such as acoustic, radio frequency (RF), infrared, and/or other wired and/or wireless media and components. In addition to computing systems, devices, etc., various embodiments can be implemented as a computer process (e.g., a method), an article of manufacture, such as a computer program product or computer readable media, computer readable storage medium, and/or as part of various communication architectures.

Suitable programming means include any means for directing a computer system or device to execute steps of a method, including for example, systems comprised of processing units and arithmetic-logic circuits coupled to computer memory, which systems have the capability of storing in computer memory, which computer memory includes electronic circuits configured to store data and program instructions. An exemplary computer program product is useable with any suitable data processing system. While a certain number and types of components are described, it will be appreciated that other numbers and/or types and/or configurations can be included according to various embodiments. Accordingly, component functionality can be further divided and/or combined with other component functionalities according to desired implementations.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computing device. Any such computer storage media may be part of device.

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components of can include any of a type, number, and/or combination of networks and the corresponding network components include, but are not limited to, wide area networks (WANs), local area networks (LANs), metropolitan area networks (MANs), proprietary networks, backend networks, etc.

Client computing devices/systems and servers can be any type and/or combination of processor-based devices or systems. Additionally, server functionality can include many components and include other servers. Components of the computing environments described in the singular tense may include multiple instances of such components. While certain embodiments include software implementations, they are not so limited and encompass hardware, or mixed hardware/software solutions. Other embodiments and configurations are available.

Exemplary Operating Environment

Figure 7:
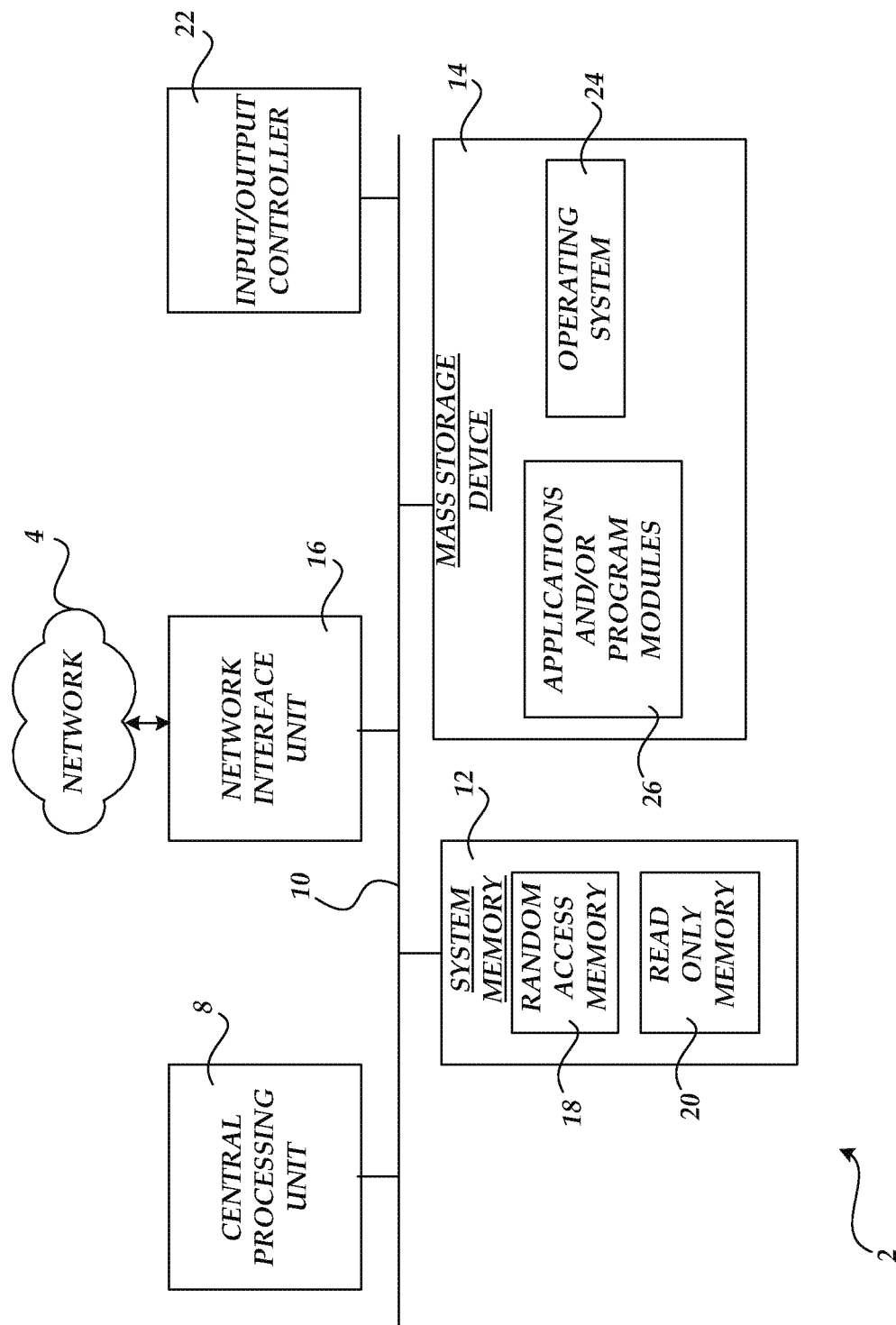
FIG. 7 is a block diagram illustrating an exemplary computing device for implementation of various embodiments described herein.

Referring now to FIG. 7, the following discussion is intended to provide a brief, general description of a suitable computing device in which embodiments of the invention may be implemented. While embodiments of the invention will be described in the general context of program modules that execute in conjunction with program modules that run on an operating system on a personal computer, those skilled in the art will recognize that the invention may also be implemented in combination with other types of computer systems, devices, and/or program modules.

Generally, program modules include routines, programs, components, data structures, and other types of structures that perform particular tasks or implement particular abstract data types. Moreover, those skilled in the art will appreciate that the embodiments of the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

As shown in FIG. 7, computer 2 comprises a general purpose server, desktop, laptop, handheld, tablet or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 24, application programs, and other program modules (e.g., applications and/or other program modules 26).

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 24 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store the applications and/or program modules 26 which may include, without limitation, a web application platform, word processing, spreadsheet, drawing, e-mail, and other applications and/or program modules, etc. It should be understood that the web application platform may allow for the management and provisioning of intranet portals, extranets, websites, document & file management, collaboration spaces, social tools, enterprise search, business intelligence, process integration, system integration, workflow automation, and core infrastructure for third-party solutions. In accordance with an embodiment, the applications and/or program modules 26 may comprise the SHAREPOINT web application platform from MICROSOFT CORPORATION of Redmond, Wash.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A client computer comprising:
a memory for storing executable program code; and
a processor, functionally coupled to the memory, the processor being responsive to computer-executable instructions contained in the program code and operative to:
receive a payload comprising delta data in response to a navigation request for an electronic page;
parse the delta data for the electronic page;
update page contents for a baseline electronic page based on the received delta data;
determine that a page state of the baseline electronic page matches a state of the electronic page returned from a full page load, wherein the processor being operative to determine that the page state of the baseline electronic page matches a state of the electronic page returned from the full page load comprises the processor being operative to:
simulate running a load event on script file objects on the electronic page, and
simulate firing the load event on the electronic page;
determine whether one or more errors are associated with a page load process for the electronic page;
in response to determining one or more errors are associated with the page load process performing at least one of the following:
reload the baseline electronic page and updating the page contents of the reloaded baseline electronic page based on the delta data, and
load a different baseline electronic page than the baseline page previously associated with the electronic page and updating the page contents of the different baseline electronic page based on the delta data;
manage a fragment identifier portion of a uniform resource locator (URL) to track a current location in a navigation of the electronic page, including enabling the multiple page components to use the fragment identifier portion of the URL to identify a current state of the electronic page and filter, based on the identified current state, a set of content in the delta data to those portions that have changed or to be updated; and
update the fragment identifier portion of the URL to match the URL of the electronic page.

2. The client computer of claim 1, wherein the processor is further operative to intercept one or more navigation click events.

3. The client computer of claim 1, wherein the processor is further operative to:
fire an unload event to enable controls on a previous electronic page to handle the unload event.

4. The client computer of claim 1, wherein the processor, in updating page contents for the electronic page based on the received delta data, is operative to match a page state of the electronic page with that of an electronic page returned from a full page load.

5. The client computer of claim 4, wherein the processor is further operative to:
insert updated markup into updateable regions on the electronic page;

remove unneeded stylesheet links and style blocks with respect to a subsequent electronic page;
add new stylesheet links and new style blocks for the subsequent electronic page;
remove input elements from forms added by a previous electronic page;
detach event handlers attached by the previous electronic page;
update script file objects to an initial state;
return a global script surface to an initial state;
cancel script timeouts and script intervals;
add new script file references to the electronic page;
call an initialization function on each of a plurality of script files in an order that the plurality of script files are loaded on the electronic page;
insert inline script blocks;
simulate running a load event on the script file objects; and
simulate firing the load event on the electronic page.

6. The client computer of claim 1, wherein the processor, in response to determining that one or more errors are associated with a page load process, is operative to:
re-run the navigation to the electronic page on the reloaded baseline electronic page.

7. The client computer of claim 1, wherein the processor, in response to determining that one or more errors are associated with a page load process, is operative to redirect a fully rendered electronic page in response to the navigation request.

8. A method comprising:
receiving, by a client computing device, a payload comprising delta data in response to a navigation request for an electronic page;
parsing, by the client computing device, the delta data for the electronic page;
updating, by the client computing device, page contents for the electronic page based on the received delta data;
determining that a page state of the baseline electronic page matches a state of the electronic page returned from a full page load, wherein determining that the page state of the baseline electronic page matches a state of the electronic page returned from the full page load comprises:
simulating running a load event on script file objects on the electronic page, and
simulating firing the load event on the electronic page;
determining, by the client computing device, whether one or more errors are associated with a page load process for the electronic page;
in response to determining one or more errors are associated with the page load process performing at least one of the following:
reloading the baseline electronic page and updating the page contents of the reloaded baseline electronic page based on the delta data, and
loading a different baseline electronic page than the baseline page previously associated with the electronic page and updating the page contents of the different baseline electronic page based on the delta data;
managing, by the client computing device, a hash portion of a uniform resource locator (URL) to track a current location in a navigation of the electronic page, including enabling multiple page components to use the hash portion of the URL to identify a current state of the electronic page and to filter, based on the identified current state, a set of content in the delta data to those portions that have changed or to be updated; and
updating the hash portion of the URL to match the URL of the electronic page.

9. The method of claim 8, further comprising:
firing an unload event to enable controls on a previous electronic page to handle the unload event.

10. The method of claim 8, wherein updating page contents for the electronic page based on the received delta data comprises matching a page state of the electronic page with that of an electronic page returned from a full page load.

11. The method of claim 10, further comprising:
inserting updated markup into updateable regions on the electronic page;
removing unneeded stylesheet links and style blocks with respect to a subsequent electronic page;
adding new stylesheet links and new style blocks for the subsequent electronic page;
removing input elements from forms added by a previous electronic page;
detaching event handlers attached by the previous electronic page;
updating script file objects to an initial state;
returning a global script surface to an initial state;
cancelling script timeouts and script intervals;
adding new script file references to the electronic page;
calling an initialization function on each of a plurality of script files in an order that the plurality of script files are loaded on the electronic page;
inserting inline script blocks;
simulating running a load event handler on the script file objects; and
simulating firing the load event on the electronic page.

12. The method of claim 8, wherein determining that one or more errors are associated with a page load process, comprises:
re-running the navigation to the electronic page on the reloaded baseline electronic page.

13. The method of claim 8, wherein determining that one or more errors are associated with a page load process, comprises redirecting a fully rendered electronic page in response to the navigation request.

14. A computer-readable hardware storage device comprising computer-executable instructions which, when executed by a computing device, will cause the computing device to perform a method comprising:
receiving a payload comprising delta data in response to a navigation request for an electronic page;
parsing the delta data for the electronic page;
updating page contents for the electronic page based on the received delta data;
determining that a page state of the electronic page matches a state of an electronic page returned from a full page load, wherein determining that the page state of the electronic page matches a state of an electronic page returned from a full page load comprises:
simulating running a load event on script file objects on the electronic page; and
simulating firing the load event on the electronic page;
determining whether one or more errors are associated with a page load process for the electronic page;
in response to determining one or more errors are associated with the page load process performing at least one of the following:
reloading the baseline electronic page and updating the page contents of the reloaded baseline electronic page based on the delta data, and loading a different baseline electronic page than the baseline page previously associated with the electronic page and updating the page contents of the different baseline electronic page based on the delta data;

managing a fragment identifier portion of a uniform resource locator (URL) to track a current location in a navigation of the electronic page, including enabling multiple page components to use the fragment identifier portion of the URL to identify a current state of the electronic page and to filter, based on the identified current state, a set of content in the delta data to those portions that have changed or to be updated; and updating the fragment identifier portion of the URL to match the URL of the electronic page.

15. The computer-readable hardware storage device of claim 14, further comprising:

firing an unload event to enable controls on a previous electronic page to handle the unload event.

16. The computer-readable hardware storage device of claim 14, wherein determining that one or more errors are associated with a page load process comprises:

re-running the navigation to the electronic page on the reloaded baseline electronic page.

17. The computer-readable hardware storage device of claim 14, wherein determining that one or more errors are associated with a page load process comprises redirecting a fully rendered electronic page in response to the navigation request.

* * * * *